Patented Apr. 28, 1936

2,038,631

UNITED STATES PATENT OFFICE 2,038,631

GASOLINE AND METHOD OF MAKING THE SAME

Harry T. Bennett, Tulsa, Okla., and Le Roy G. Story, Mount Vernon, N. Y., assignors, by mesne assignments, to Gasoline Antioxidant Company, Wilmington, Del., a corporation of Delaware No Drawing. Original application January 16, 1928, Serial No. 247,256. Divided and this application November 12, 1930, Serial No. 495,285

4 Claims. (Cl. 44—9)

This invention relates to gasoline and more particularly to cracked gasoline.

An important object of the invention is to produce a cracked gasoline which will not deposit a residue of gum when vaporized. This is accomplished by treating fresh cracked gasoline so that it will neither deposit appreciable amounts of gum when immediately evaporated nor accumulate said gum in solution when standing in storage for long periods before consumption.

A further object is to preserve the anti-knock quality of the cracked gasoline.

With the foregoing objects in view, we will proceed to point out some of the undesirable characteristics of cracked gasoline, how our invention overcomes these undesirable characteristics, and finally compare our methods with those previously used and point out the advantages of the methods we have discovered.

Cracked gasolines have the property, even when freshly made, of depositing dark brown gummy residues on surfaces from which they are slowly evaporated. The composition of the deposit is not fully understood, but has become known in the trade as gum and will hereinafter be referred to by this term. The chemical reaction producing the gum is also not fully understood, but we believe it is an oxidation reaction, either internal or external; internal oxidation being that taking place within the material, itself, and external that caused by some external power as oxygen from the air or the rays of light.

Another property commonly noted in gasolines made from cracked products is formation of gum in solution, which is evidenced by an increase in the deposit left by evaporating a sample that has stood for some time in comparison with that formed by the original material before aging. The compounds which have the power of producing gum when the fresh sample is evaporated apparently proceed to form gum in solution when the same product is allowed to stand.

A further property also related to gum is the detonation characteristic. It is related in that a gasoline which has accumulated appreciable quantities of gum in solution also shows a greater tendency to knock. In other words, the gum which causes a darkening in color and also produces a non-volatile deposit, apparently is composed of or associated with compounds which cause knocking in the internal combustion engine. It is important to prevent the formation of compounds which promote detonation in cracked fuels because it is by virtue of the cracked or unsaturated nature of these fuels that they have become recognized as anti-knock gasolines.

Our invention overcomes the above mentioned gum and detonation problems by inhibiting the reactions which produce gum either when the fresh sample is evaporated or when the same product is allowed to age before evaporation; and, as previously pointed out, there being a close relationship between these properties, by preventing or inhibiting the reactions which produce gum, we also suppress the formation of compounds causing detonation.

The invention which we will hereinafter describe is concerned with the prevention of the reactions which cause formation of gum rather than the remedy after the harm or effect has been caused, for we have found that once the gum has accumulated in solution, it is very difficult to remove it without drastic treatment. But, on the other hand, by simple treatment of the fresh gasoline by our method before the harm has resulted, it is very easy to inhibit the formation of gum when the sample is evaporated or when it is allowed to stand.

In order to overcome these undesirable properties of cracked gasoline, we add to the gasoline a small quantity of certain organic compounds which we have discovered have the property of inhibiting formation of the undesirable gum. The nature of the inhibiting reaction, whereby these organic compounds function to prevent the formation of gum, is not clearly understood, but we characterize the compounds as inhibitors, antioxidants, negative catalysts, or simply anti-gum formers. Within the group of anti-gum formers we have found the following, among others, to be useful.

Para-phenylenediamine, meta-phenylenediamine, orthophenylenediamine, and benzidene, and in general aromatic amines and derivatives thereof.

The quantity of anti-gum former required to accomplish our purpose varies from two to fifty milligrams per 100 cubic centimeters of the gasoline, depending on the nature of the gasoline to be treated, but we prefer to use approximately ten milligrams per 100 cubic centimeters. These may be added to the gasoline directly or they may be previously dissolved in a solvent such as acetone, benzol or ether, etc., and then added, in solution, to the gasoline. The latter method has been found to be advantageous where the material is difficultly dissolved.

In actual practice we prefer to treat a raw cracked gasoline direct from the still with approximately ten milligrams of the anti-gum former, for example, paraphenylenediamine, per 100 cubic centimeters. By this treatment we have found that the treated gasoline will deposit no appreciable gum when immediately evaporated or after aging for long periods.

We wish to point out that our process is equally applicable to any gum-forming gasoline, whether previously treated or not, as well as the raw cracked gasoline mentioned in our preferred form. In fact our process is valuable for treating blended fuels such as those containing products not strictly from petroleum among which may be mentioned those derived from coal tar or shale oil.

Prior to our invention the methods used consisted in treating the cracked gasoline with polymerizing agents such as sulfuric acid, fuller's earth, etc., whereby the gum forming constituents were polymerized and removed as sludge. Such methods are costly because they require special equipment, large quantities of treating reagents and considerable time for the operations. Also the prior methods removed products which are valuable as fuel, especially for anti-knock purposes. Our process on the other hand is simple in that any tank or similar equipment available in the ordinary refinery may be used for adding the anti-gum former and the time required is of no important consideration; it is inexpensive, in that the quantity of treating material is very small since it enters into the reaction more in the nature of a catalyst than in quantitative proportions, and lastly no valuable constituents of the gasoline are lost as sludge.

This application is a division of our prior application Serial No. 247,256, filed January 16, 1928.

We claim:

1. The method of treating motor fuel containing unsaturated cracked hydrocarbon constituents which tend to develop gums on storage, comprising incorporating therein a small proportion of an orthophenylenediamine in quantity sufficient to substantially inhibit said gum formation.

2. The method of preserving a motor fuel comprising cracked hydrocarbon distillates which tend to form gum and deteriorate in anti-knock qualities on storage, which comprises adding to said motor fuel a small proportion of an orthophenylenediamine in quantity sufficient to retard said gum formation and deterioration.

3. A motor fuel product comprising cracked gasoline which tends to deteriorate and develop gums on storage, said product containing a small proportion of ortho-phenylenediamine in quantity sufficient to substantially inhibit said gum formation.

4. A motor fuel product comprising unsaturated cracked hydrocarbon distillates which tend to deteriorate and develop gums on storage, said product containing a small proportion of ortho-phenylenediamine in quantity sufficient to substantially inhibit said gum formation.

HARRY T. BENNETT.
LE ROY G. STORY.